(12) United States Patent
Frost et al.

(10) Patent No.: US 7,664,050 B2
(45) Date of Patent: Feb. 16, 2010

(54) AUTO-CONFIGURING OPERATION MODES FOR NETWORK ELEMENTS

(75) Inventors: Dennis G. Frost, Kirkland, WA (US); Glenn R. Ward, Redmond, WA (US); John P. Pennock, Sammamish, WA (US); Scott A. Manchester, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 454 days.

(21) Appl. No.: 11/461,759

(22) Filed: Aug. 1, 2006

(65) Prior Publication Data

US 2007/0253344 A1 Nov. 1, 2007

Related U.S. Application Data

(60) Provisional application No. 60/745,943, filed on Apr. 28, 2006.

(51) Int. Cl.
*H04L 12/28* (2006.01)
(52) U.S. Cl. .................................................... 370/254
(58) Field of Classification Search ................ 370/254, 370/400, 401, 351, 419, 420, 421; 380/270; 726/12, 3; 70/223, 226, 238, 200.5, 200.51, 70/200.52, 200.58
See application file for complete search history.

(56) References Cited

U.S. PATENT DOCUMENTS 5,819,042 A * 10/1998 Hansen ....................... 709/222
7,099,295 B1 * 8/2006 Doyle et al. ................. 370/338
2003/0212802 A1 * 11/2003 Rector et al. ................. 709/228
2004/0103278 A1 * 5/2004 Abhishek et al. ............ 713/160
2006/0280189 A1 * 12/2006 McRae et al. ............... 370/401

OTHER PUBLICATIONS

IEEE 802.3ab-1999 IEEE Supplement to Standard for Carrier Sense Multiple Access with Collision Detection (CSMA/CD) Access Method and Physical Layer Specifications- Physical Layer Parameters and Specifications for 1000 Mb/s Operation Over 4-Pair of Category 5 Balanced Copper Cabling, Type 1000BASE-T.
R. Droms, "Dynamic Host Configuration Protocol", RFC 2131, Mar. 1997.
R. Droms, "Dynamic Host Configuration Protocol," Network Working Group, Bucknell University, Mar. 1997.
Supplement to Carrier Sense Multiple Access with Collision Detection (CSMA/CD) Access Method and Physical Layer Specifications—Physical Layer Parameters and Specifications for 1000 Mb/s Operation Over 4-Pair of Category 5 Balanced Copper Cabling, Type 1000BASE-T, LAN MAN Standards Committee of the IEEE Computer Society, Jun. 26, 1999.

* cited by examiner

*Primary Examiner*—Frank Duong
(74) *Attorney, Agent, or Firm*—Shook, Hardy & Bacon, LLP (57) ABSTRACT

A method to automatically configure a network device is provided. Without user intervention, configuration messages are generated and transmitted on physical interfaces associated with the network device. Acknowledgements to the configuration messages provide connectivity information that is utilized to instruct the network device to operate in a first, second, or third operational mode. The network device loads instructions associated with each mode to allow the network device to automatically provide connectivity based on the network configuration or topology of the domain or segment associated with the network device.

20 Claims, 6 Drawing Sheets

AUTO-CONFIGURING OPERATION MODES FOR NETWORK ELEMENTS

CROSS-REFERENCE TO RELATED APPLICATION

This application claims priority under 35 U.S.C. § 119 to provisional application 60/745,943, filed on Apr. 28, 2006,

STATEMENT REGARDING FEDERALLY SPONSORED RESEARCH OR DEVELOPMENT

Not applicable.

BACKGROUND

Conventionally, network elements, such as routers, switches, bridges, and access points are configured manually by an administrator having specialized technical knowledge associated with the type of network and the topology of the network. Advances in home networking have increased the presence of network elements in environments where users do not have specialized technical knowledge and are uncertain about the best way to configure a network element to provide optimal connectivity for all devices connected to the network.

Also, adoption of wireless technologies has increased the complexity of determining how network elements in a wireless environment should be configured to allow reliable and secure communications. Wireless environments allow greater mobility by freeing users from location restrictions associated with wired networks. In some wireless environments single purpose network elements may operate either as an access point or as a bridge. Other wireless environments may provide dual-purpose network elements that require manual configuration to instruct the network element to operate as a bridge or access point. The manual configuration may require the user to navigate to a web interface to configure the network element or the network element may be provisioned with a physical switch that allows the user to manually switch the network element between operating as a bridge or an access point. Current configuration procedures require significant user involvement and assume that a user understands differences in network topology when the network element operates as a bridge or access point.

For instance, a wireless access point is a network element that allows wireless devices having wireless radios to form a wireless network that permits the devices to utilize wireless connectivity. On the other hand, a bridge forwards traffic from one network to another network. For example, the bridge may forward traffic from a wireless network to a wired network to facilitate communication between wireless devices and wired devices.

Configuring a network element to operate as a bridge or access point may not be intuitive to an average user that does not have the technical prowess to determine the best configuration for the network. The conventional methods require significant user intervention and fail to provide plug-and-play capabilities for the network elements.

SUMMARY

Embodiments of the invention relate to a methods, systems and network devices that automatically select an operational mode for a network element based on sensed network configurations or response messages received in response to configuration messages generated by a network device. The operational mode may include a first, second, or third mode, the modes corresponding to bridge operations, access point operations, or disconnected operations, respectively. In some embodiments, the network device loads instructions associated with a selected operational mode based on the response message, which may be an acknowledgement message to the configuration message. The acknowledgement message may contain connectivity data that may be utilized to select the operational mode without user intervention.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Further, the present invention is described in detail below with reference to the attached drawing figures, which are incorporated in their entirety by reference herein.

Embodiments of the invention provide a network device having physical interfaces that connect disparate networks. The network device provides plug-and-play capabilities, which allows the network device to automatically provide communications for the disparate networks. Without user intervention, the network device generates configuration messages and, based on response messages to the configuration messages, the network device operates as a bridge or access point. In certain embodiments the network device senses the physical connections associated with the network device and, if the sensed polarity of the physical connections indicates that similar devices are connected, automatically configures the network device to operate as a bridge.

Additionally, embodiments of the invention provide a system and method for automatically configuring a network device having physical interfaces. The system may include a first and second network and a network device that is able to communicate with the first and/or second networks as a bridge or access point based on response messages to configuration messages generated by the network device. The method for configuring the network device generates configuration messages and loads and executes operation instructions associated with a bridge or access point, when the response messages associated with the configuration messages are processed by the network device.

As utilized throughout the description, the term "component" refers to firmware, software, hardware, or any combination of the above.

Figure 1:
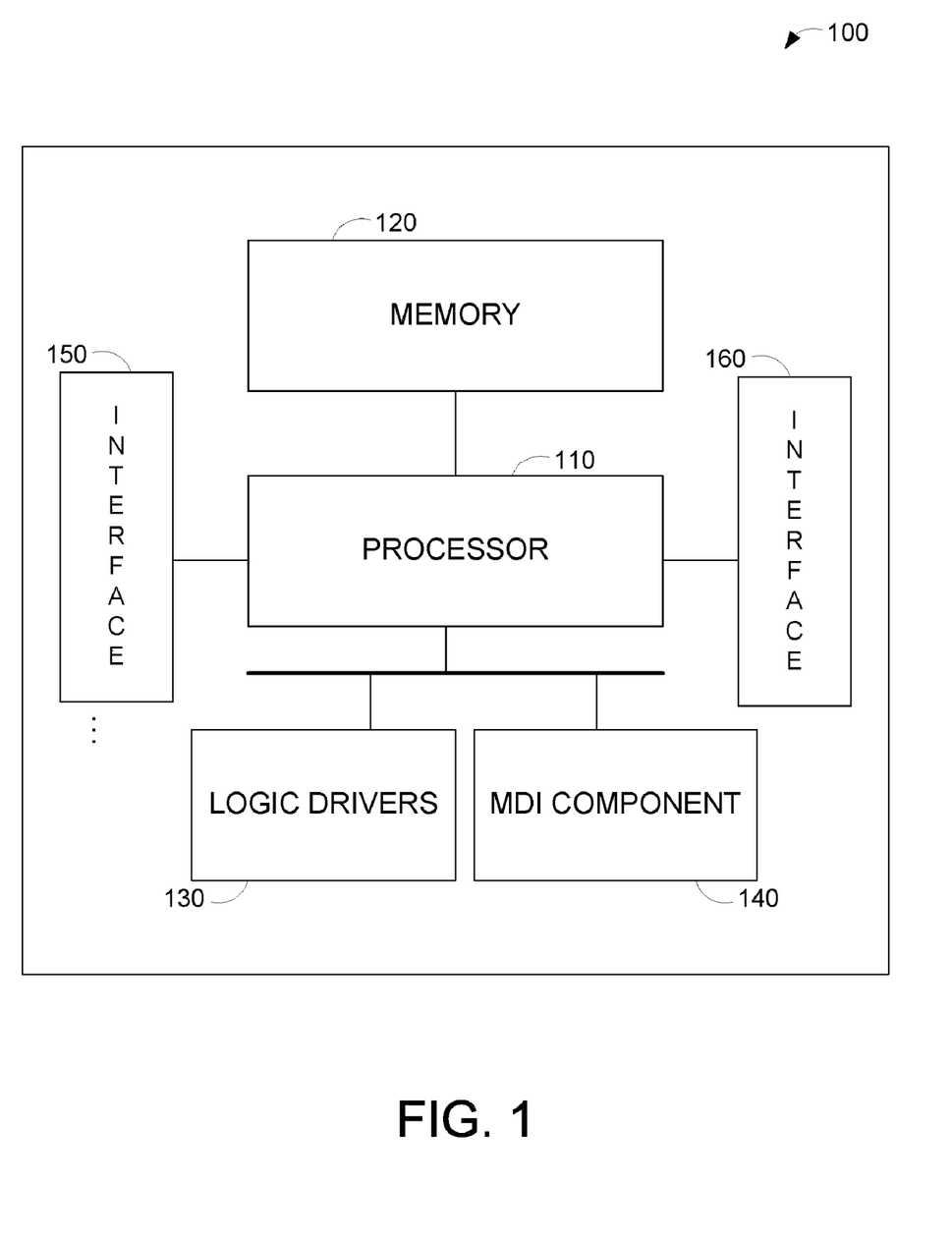
FIG. 1 is a block diagram that illustrates an exemplary network device, according to embodiments of the invention.

FIG. 1 is a block diagram that illustrates an exemplary network device 100, according to embodiments of the invention. The network device 100 shown in FIG. 1 is merely exemplary and is not intended to suggest any limitation as to scope or functionality. Embodiments of the invention are operable with numerous other configurations. With reference to FIG. 1, the network device 100 includes a processor 110 having connections to a memory 120, logic drivers 130, a media dependent interface (MDI) component 140, and physical interfaces 150 and 160 all communicatively connected to a bus (not shown). The network device 100 may automatically configure the processor 110 to operate in a bridge or access point mode based on the plug-and-play capabilities associated with the network device 100. In some embodiments, the network device 100 may also operate in a disconnected mode. Additionally, the network device 100 may include a power-off mode to indicate that the network device is not receiving an appropriate level of power.

The processor 110 is configured to execute instructions that automatically configure the network device 100 to operate in an appropriate mode based on a user's inferred intent, which is gleaned from the physical connections associated with the network device 100. As more fully described below, the processor 110 selects the mode of operation by utilizing the sensed network topology or connections associated with network device 100.

The memory 120 is configured to store instructions that are executed by the processor 110, where the instructions provide the appropriate operational mode of the network device 100. The memory 120 is also configured to store mode information that indicates the current operational mode. For instance, when the device is disconnected, the memory may store information that indicates "Link Down." However, when the device is connected, the memory may store information that indicates "Access Point Link Up" or "Bridge Link Up," which corresponds to the operational instructions currently being executed by the processor 110.

The logic drivers 130 are configured to provide the instructions that configure the network device 100 to operate in access point mode, bridge mode or disconnected mode. In certain embodiments, in disconnected mode, the logic drivers 130 are configured to instruct the device to generate and transmit configuration messages that request connectivity data on all physical interfaces 150 and 160 and to listen promiscuously on all physical interfaces 150 and 160. Based on response messages received on the physical interfaces 150 and 160, the logic drivers 130 may instruct the network device 100 to move from disconnected mode to bridge mode or access point mode, as appropriate. In an embodiment, the request for connectivity data may ask for an Internet Protocol (IP) address.

The MDI component 140 is configured to sense the polarity of connections between the network device 100 and network elements to determine whether the connection is a homogenous connection, such as data terminating equipment (DTE) to DTE connection. DTEs includes, for example, computers, printers, or any device that requires access to a communication device. Here, the MDI component 140 may instruct the network device 100 to operate in a bridge mode when the physical connections indicate similar devices are connected, such as DTE to DTE. The MDI component may be utilized to provide internal cross-over by adjusting the polarity of the physical interface, which may improve the efficiency of selecting an operational mode, such as bridge mode. The MDI component 140 provides suggestions that indicate a permanent or temporary operational mode. In certain embodiments, the permanent operational mode does not require a response message or acknowlegement on the physical interfaces 150 and 160 of the network device 100. In some embodiments, the MDI component 140 infers that a DTE-DTE connection indicates an intent by the user to have the network device 100 operate in bridge operational mode. In some embodiments, the MDI component 140 operates in accordance with IEEE's 802.3ab auto-MDI/MDIX standard.

The interfaces 150 and 160 are physical interfaces that allow the network device 100 to connect to one or more network elements or networks. The physical interfaces 150 and 160 may include cable, powerline, Ethernet, wireless, or any other equivalent interface. The network device 100 includes a combination of different interfaces 150 and 160. The interfaces 150 and 160 are configured to receive and transmit communications between the network device 100 and the networks or network elements associated with the networks. In an embodiment, the interfaces 150 and 160 may include 802.3 and 802.11, respectively.

Accordingly, as more fully described below with reference to FIG. 6, a network device (e.g., network device 100) automatically selects an operational mode based on an inferred user's intent, which is gathered from the physical connections associated with the network device. Additionally, messages may be utilized to initiate an automated configuration routine that instructs the device to operate either in a bridge or access point mode. Thus, the network device 100 can be configured without user intervention, and a user with minimal technical networking knowledge is able to connect network elements to the network device 100, which utilizes logic drivers 130 to provide plug-and-play functionality that automatically configures the network device 100 to enable connectivity.

In an embodiment, network device 100 may be a multiple operational mode layer-2 network device including one or more 802.3 physical interfaces and one or more 802.11 physical interfaces. The multiple operational mode layer-2 network device may provide at least two operational modes: 802.11 access point mode and 802.3-to-802.11 bridge mode. When a user connects the 802.3 physical interface of the multiple operational mode layer-2 network device to a network element, such as an Internet gateway, a broadband modem, or data communication equipment (DCE), the multiple operational mode layer-2 network device may operate in access point mode because the intention of the user may be inferred as an intention to add wireless connectivity to the existing communication network. Alternatively, when the user connects the 802.3 physical interface of the multiple operational mode layer-2 network device to a network element, such as a personal computer, printer, DTE, or media player device, the multiple operational mode layer-2 network device may operate in bridge mode because the intention of the user may be inferred as an intention to connect to an existing wireless network. Accordingly, automatic operational mode selection enables plug-and-play capabilities and significantly improves a user's setup experience by reducing the complexities associated with configuring the multiple operational mode layer-2 network device. One of ordinary skill in the art appreciates and understands that embodiments of the invention may be applied to network devices having any combination of disparate physical interfaces and is not limited to just network devices having 802.3 and 802.11 physical interfaces.

Figure 2:
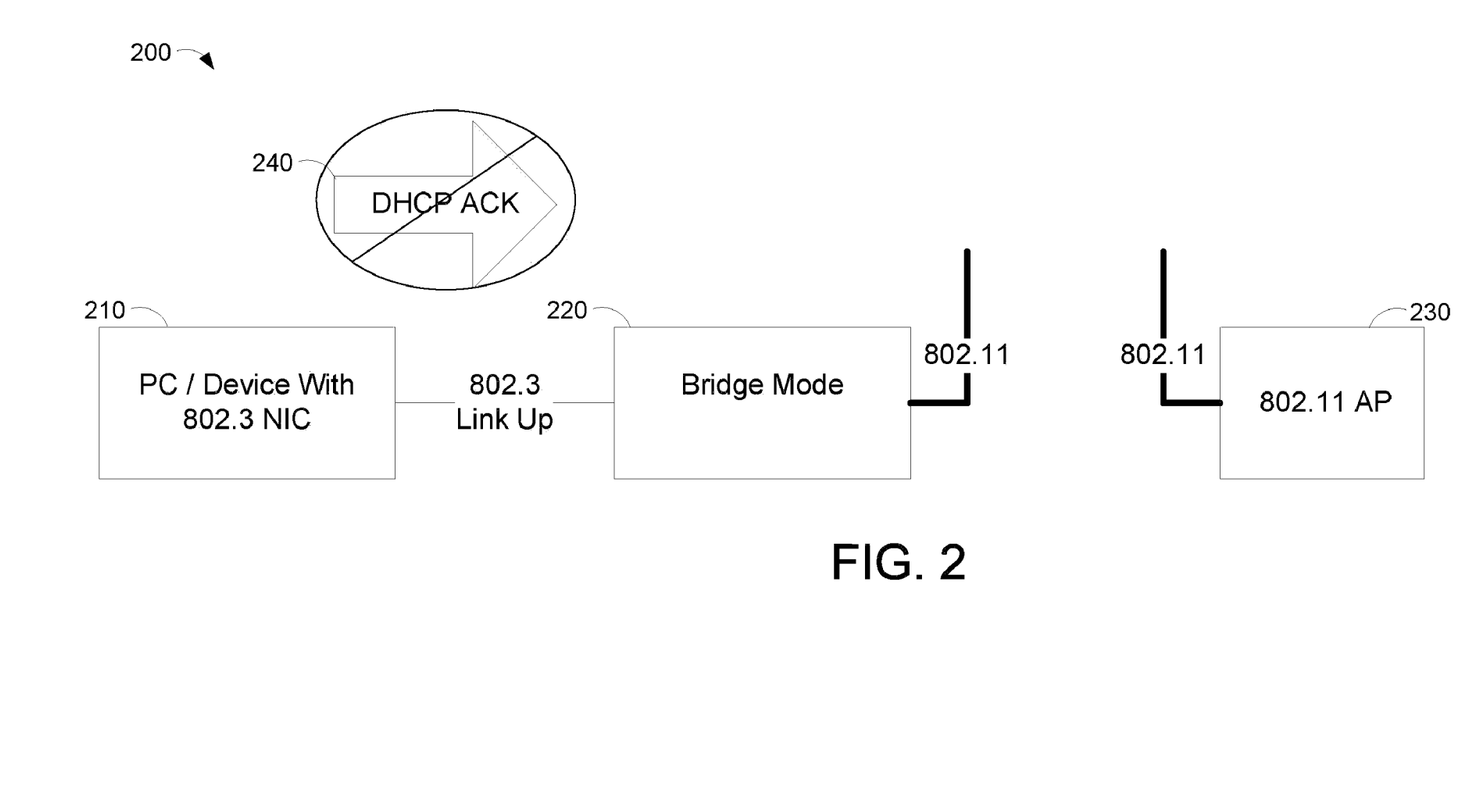
FIG. 2 is a network diagram that illustrates an exemplary network infrastructure that causes the network device to automatically operate in a bridge operational mode, according to embodiments of the invention.

FIG. 2 is a network diagram that illustrates an exemplary network infrastructure 200 that permits a network device 220 to automatically operate in a bridge operational mode, according to embodiments of the invention.

The network device 220 includes 802.3 and 802.11 physical interfaces associated with network elements 210 and 230, respectively. The network device 220 supports multiple layer-2 operational modes and, in the illustrated embodiment, is physically connected to a network element 210, such as a personal computer or DTE via the 802.3 physical interface of the network device 220. When the network device 220 connects to the network element 210, a link-up event is generated. In turn, configuration messages, such as a Dynamic Host Configuration Protocol (DHCP) requests for IP addresses, are sent out on all physical interfaces. Because the 802.3 physical interface is not connected to a network segment having a DCE, such as a DHCP server, no DHCP acknowledgement 240 will be received on the 802.3 physical interface. Thus, based on the configuration message and response, the network device 220 may infer that the intended use of the network device 220 is to operate as an 802.3-802.11 bridge. Accordingly, the network device 220 loads and executes instructions associated with bridge operations.

In some embodiments, the decision to operate in bridge mode may be supplemented by messages received from a MDI component (not shown) included in the network device 220. The MDI component is configured to sense polarities on the 802.3 interface to determine whether the network device 220 is attached to a DCE or DTE. Based on this determination, performance improves because the time necessary to ascertain the correct operating mode decreases. In some embodiments, the maximum time necessary to determine the appropriate operational mode is approximately equal to the DHCP timeout, which is approximately one minute.

Figure 3:
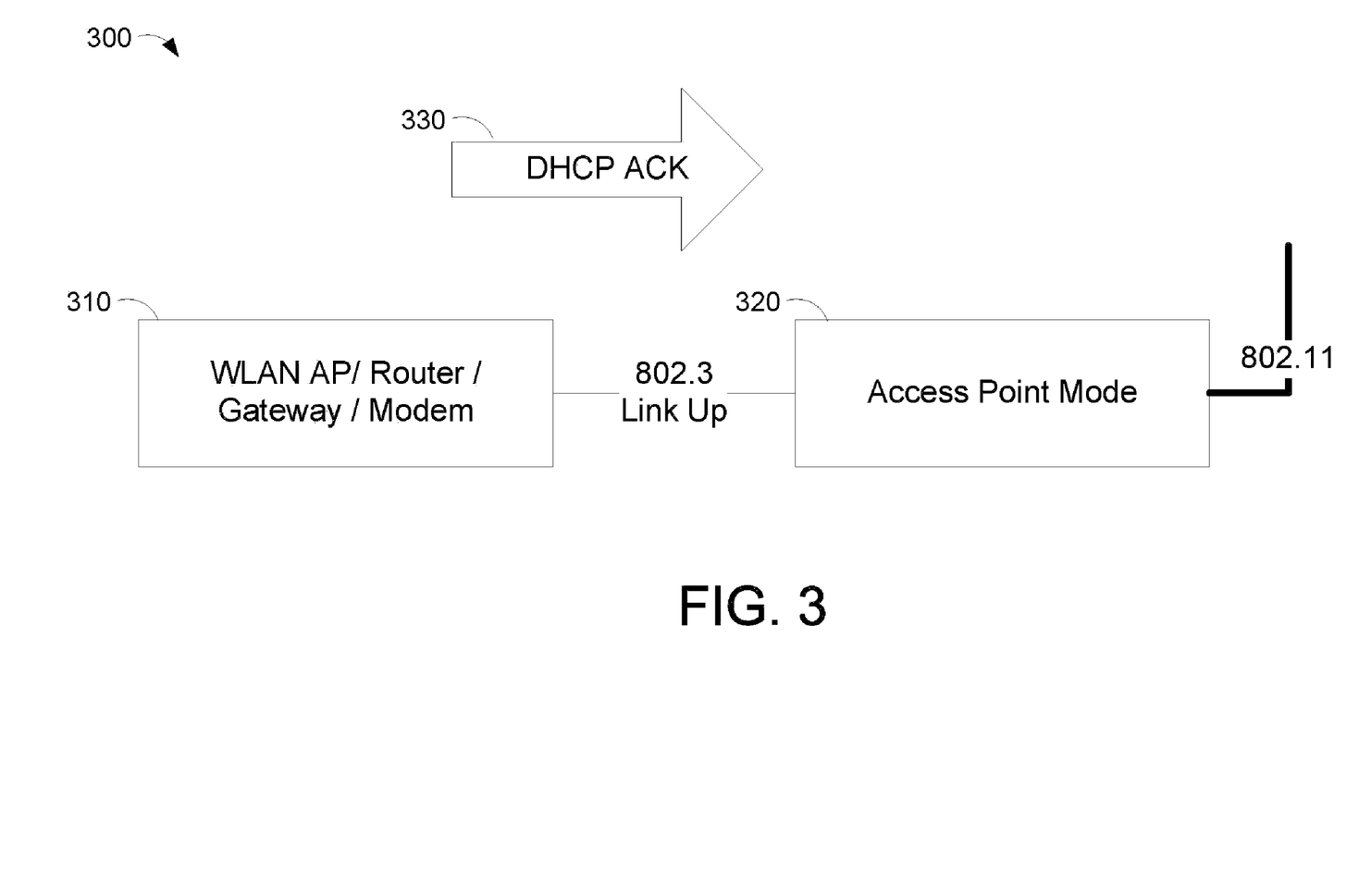
FIG. 3 is a network diagram that illustrates a network infrastructure that causes the network device to automatically operate in an access point operational mode, according to embodiments of the invention.

FIG. 3 is a network diagram that illustrates a network infrastructure 300 that permits a network device 320 to automatically operate in an access point operational mode, according to embodiments of the invention.

The network device 320 includes 802.3 and 802.11 physical interfaces. Also, the network device 320 supports multiple layer-2 operational modes and, in the illustrated embodiment, is physically connected to a network element 310, such as a broadband modem, Internet gateway, or DCE via the 802.3 physical interface of the network device 320. When the network device 320 connects to the network element 310, a link-up event is generated. In turn, configuration messages, such as Dynamic Host Configuration Protocol (DHCP) requests for IP addresses, are sent out on all connected physical interfaces. When a DHCP acknowledgement 330 is received on the 802.3 physical interface, the network device 320 infers that the intended use of the network device 320 is to operate as an access point. In turn, the network device 320 loads and executes instructions that perform access point routines.

Accordingly, a network device may automatically operate in a bridge or access point mode when the physical connection or responses to configuration messages provide an indication from which it can be inferred that a user intends to operate either in access point mode or bridge mode. In some embodiments, when the network device terminates at a DCE or DTE, the configuration time may be reduced if the MDI component of the network device performs fast-detection sensing.

In certain embodiments, the physical connectivity of the physical interfaces may be established using Address Resolution Protocol (ARP) and DHCP. While ARP and DHCP are provided as examples of automatic address assignment, it is appreciated that alternative protocols that assign addresses are within the scope of embodiments of the invention.

A network device having disparate physical interfaces may be provisioned with computer-readable instructions that indicate how to process messages received on the physical interfaces. The computer-readable instructions may be provided by logic drivers (e.g., logic drivers 130 of FIG. 1) that are loaded into a memory of the network device (e.g., network device 100 of FIG. 1) and executed by a processor (e.g., processor 110 of FIG. 1) associated with the network device. The logic drivers describe actions associated with bridge, access point, or disconnected operational modes.

Figure 4:
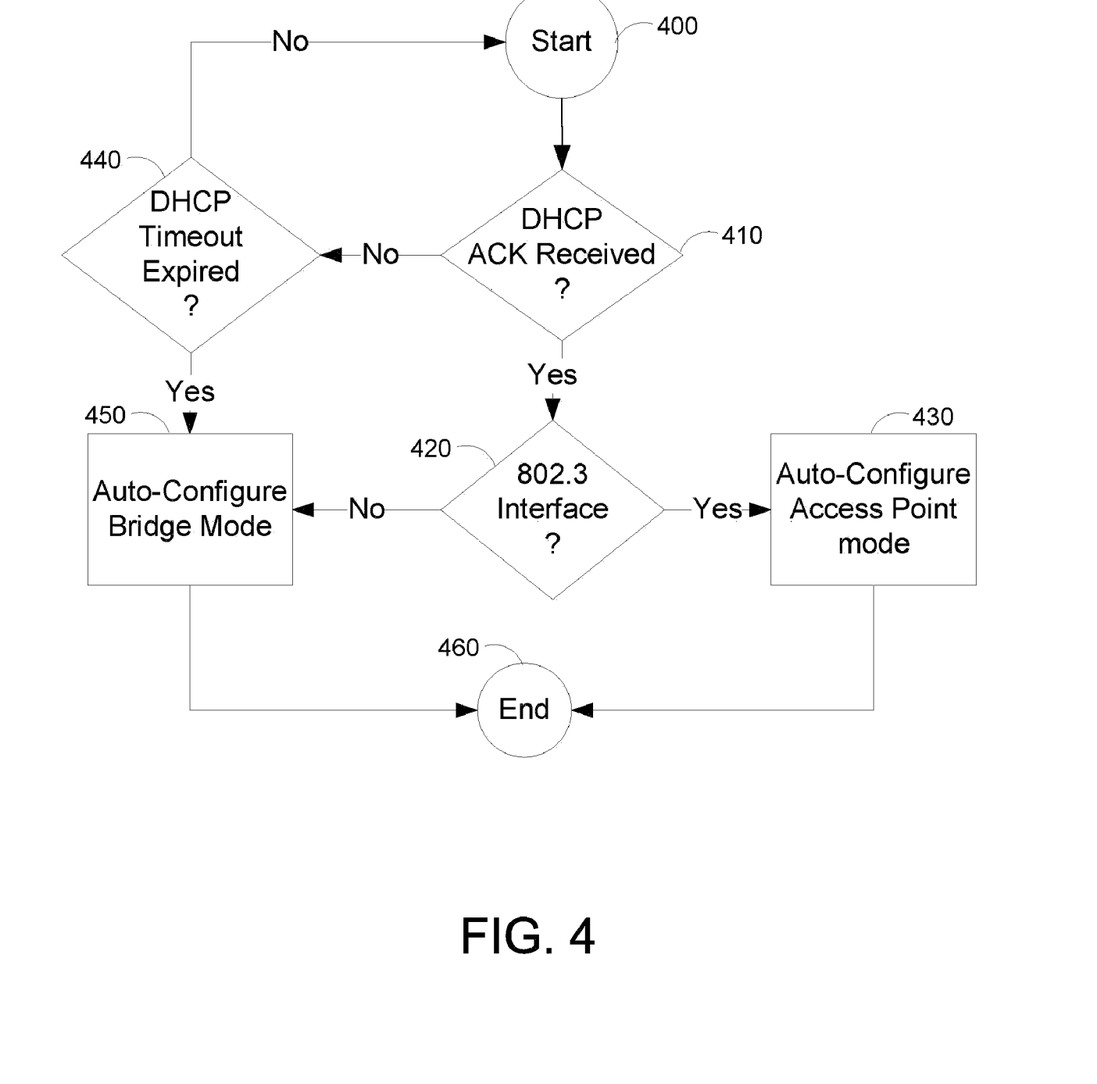
FIG. 4 is a logic diagram that illustrates an exemplary operational mode selection routine performed by the network device, according to embodiments of the invention.

FIG. 4 is a logic diagram that illustrates an exemplary operational mode selection routine performed by a network device, according to embodiments of the invention. The method starts when a link up event is generated at 400 and an indication of such is received by the network device. Subsequently, configuration messages, such as DHCP requests are generated and sent on each physical interface of the network device. Each physical interface is checked to determine whether a DHCP acknowledgement (ACK) is received, as indicated at 410.

When an ACK is received on a physical interface, another check is made to determine whether the physical interface is an 802.3 physical interface. This is indicated at 420. If the physical interface is an 802.3 physical interface, the network device is configured in access point mode at 430. Otherwise, the network device is configured in bridge mode at 450. The method terminates at 460.

When an ACK is not received at 410, the network device checks for the ACK until a DHCP time out period has expired, as indicated at 440. When the DHCP timeout period has expired, the network device is automatically configured in bridge mode, as indicated at 450. The method terminates at 460. Accordingly, a network device executing the operational mode selection routine selects the operational mode of the network device based on the physical interfaces associated with the network device and the responses received on the physical interfaces.

In another embodiment, the configuration procedure may utilize a fast-detection component, such as a MDI component to determine whether to operate in access point or bridge mode.

Figure 5:
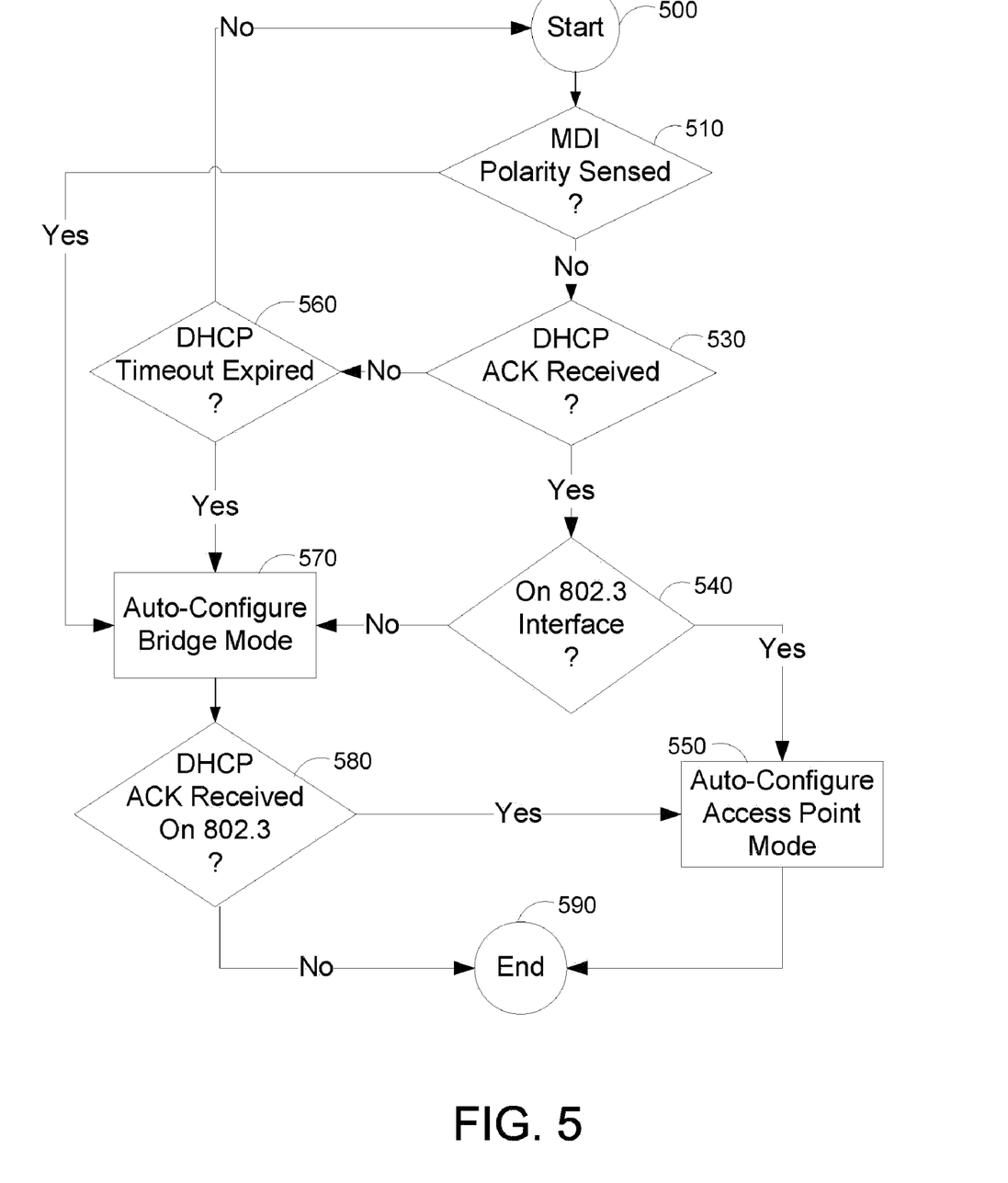
FIG. 5 is a logic diagram that illustrates another exemplary operational mode selection routine performed by the network device, according to embodiments of the invention.

FIG. 5 is a logic diagram that illustrates another exemplary operational mode selection routine performed by the network device (e.g., network device 100 of FIG. 1), according to embodiments of the invention. The method begins when a power-on event is generated and one or more physical interfaces of the network device are connected to network elements (such as a DCE or DTE) and an indication of such is received by the network device, as indicated at 500. At 510, the MDI component of the network device senses the polarity of the physical connection between the network device and the network element to determine whether the connection between network element and network device is a homogenous connection connecting similar devices, for example a DTE to DTE. When the sensed polarity indicates that similar devices are connected, the network device is automatically configured to operate in bridge mode. This is indicated at 570. The network device confirms that bridge mode is the appropriate mode by listening on the 802.3 physical interface to determine whether an ACK has been received on the 802.3 physical interface at step 580. When an ACK is received the network device automatically switches to access point mode, as indicated at 550. The method terminates at 590.

When the sensed polarity does not indicate a homogenous connection connecting similar devices at 510, the network device generates configuration messages, such as DHCP requests on each physical interface. Each physical interface is checked to determine whether a DHCP acknowledgement (ACK) is received. This is indicated at 530.

When an ACK is received on a physical interface, another check is made to determine whether the physical interface is an 802.3 physical interface, as indicated at 540. If the physical interface is an 802.3 physical interface, the network device is configured in access point mode, as indicated at 550. Otherwise, the network device is configured in bridge mode at 570. When operating in bridge mode the network device confirms that an ACK was not received on the 802.3 physical interface, as indicated at 580. Once the network device confirms that an ACK was not received on the 802.3 physical interface, the method terminates at 590.

When an ACK is not received at 530, the network device checks for the ACK until a DHCP time out period has expired, as indicated at 560. When the DHCP timeout period has expired the network device is configured in bridge mode as indicated at 570. The network device confirms that an ACK was not received on the 802.3 physical interface at step 580. Once the network device confirms that an ACK was not received on the 802.3 physical interface, the method terminates at step 590.

Accordingly, the network device provides a fast-detection component that enables the network device to chose an operational mode, such as bridge mode, in an efficient manner without waiting for responses on the physical interfaces.

In some embodiments, plug-and-play functionality allows a network device to select an appropriate operational mode based on the physical connections associated with the network device and responses processed by the network device.

Figure 6:
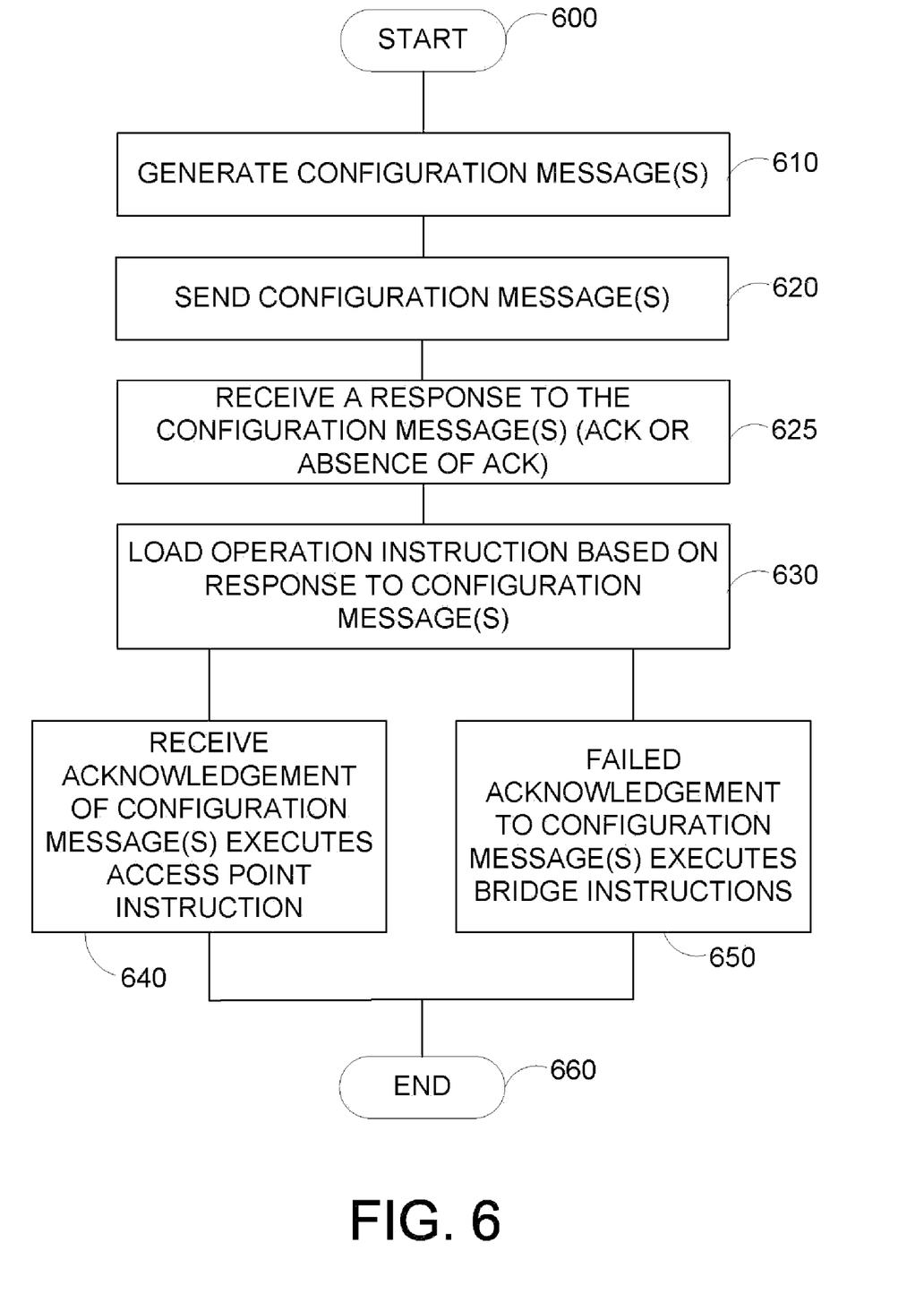
FIG. 6 is a flow diagram that illustrates an exemplary method for automatically configuring the network device in an operational mode based on sensed network configurations or responses to configuration messages, according to embodiments of the invention.

FIG. 6 is a flow diagram illustrating a method for automatically configuring a network device in an operational mode based on sensed network configurations or responses to configuration messages, in accordance with an embodiment of the invention. The method begins at 600 when a link up event is generated and an indication of such is received by the network device. Upon receiving the indication, the network device generates one or more configuration messages to request connectivity data. This is indicated at 610. The configuration messages are transmitted on each physical interface of the network device at 620 and responses, in the form of an acknowledgement or the lack of an acknowledgement, are received at 625. The network device loads operation instructions based on the received response(s) to the configuration message(s) as indicated at 630. Receiving an ACK to the configuration message(s) causes the network device to execute access point instructions as indicated at 640. Failing to receive an ACK to the configuration message(s) causes the network device to execute bridge instructions at 650. The method terminates at 660.

In summary, plug-and-play capability is provided for a multiple operational mode network device, where logic drivers are loaded and executed by the multiple operational mode network device based on the connectivity associated with the multiple operational mode network device or responses received on physical interfaces of the multiple operational mode network device. The multiple operational mode network device may infer a user's intent based on the connections associated with the physical interfaces to select access point or bridge instructions provided by the logic drivers.

In an alternative embodiment, an MDI component is utilized to advise the multiple operational mode network device of a suggested operational mode. The multiple operational mode network device temporarily loads instructions associated with the suggested operational mode and confirms that the multiple operational mode network device is in the appropriate operational mode. The multiple operational mode network device confirms the operational mode when the multiple operational mode network device does not receive a response on a specified physical interface within a predetermined period of time. After the multiple operational mode network device confirms the operational mode, the multiple operational mode network device continues to operate in the suggested mode.

As such, an embodiment of the invention relates to a method for automatically configuring a network device having a plurality of physical interfaces. The method includes generating one or more configuration messages that request connectivity data, sending the one or more configuration messages on each of the plurality of physical interfaces, receiving a response to the one or more configuration messages from each of the plurality of physical interfaces, and loading instructions that define an operational mode of the network device based on the received response.

A further embodiment of the invention relates to a system in a computing environment for configuring a network device having a plurality of physical interfaces. The system includes a first network, a second network and a network device having a plurality of operational modes, wherein a first of the plurality of operational modes automatically bridges the first and second networks based on physical connections sensed by a media dependent interface component associated with the network device.

Still further, an embodiment of the invention relates to a network device comprising one or more logic drivers configured to provide instructions for operating the network device in a first, second, or third operational mode; memory configured for storing the instructions provided by the one or more logic drivers; a plurality of physical interfaces configured to perform at least one of receiving or transmitting communications; and a processor configured to execute the instructions provided by the one or more logic drivers based on a message received on at least one of the plurality of physical interfaces.

The foregoing descriptions of the invention are illustrative. As will be understood and appreciated by those of ordinary skill in the art, modifications in configuration and implementation will occur. For instance, while the present invention has generally been described with relation to FIGS. 1-6, those descriptions are exemplary. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

We claim:

1. A method for automatically configuring a network device having a plurality of physical interfaces that include at least one wireless interface and at least one wired interface, the method comprising:
   generating one or more configuration messages that request connectivity data;
   sending the one or more configuration messages on each of the plurality of physical interfaces;
   receiving a response to the one or more configuration messages from each of the plurality of physical interfaces; and
   automatically selecting an operational mode for the network device based on sensed network configurations or the received response without user intervention, the operational mode corresponding to one of bridge operations, access point operations, and disconnected operations.

2. The method according to claim 1, wherein a first set of instructions is loaded if the received response includes an acknowledgement to the one or more configuration messages.

3. The method according to claim 1, wherein a second set of instructions is loaded if the received response includes a failure to acknowledge the one or more configuration messages.

4. The method according to claim 1, wherein the operational mode causes the device to operate as a bridge.

5. The method according to claim 1, wherein the operational mode causes the device to operate as an access point.

6. The method according to claim 1, further comprising operating in the operational mode defined by the instructions.

7. The method according to claim 6, wherein operating in the operational mode includes permanently operating in an operational mode suggested by a polarity sensing component.

8. The method according to claim 6, wherein operating in the operational mode includes temporarily operating in an operational mode suggested by a polarity sensing component.

9. The method according to claim 8, further comprising confirming the suggested operational mode, and continuing to operate in the suggested mode if a specified physical interface fails to acknowledge the one or more configuration messages.

10. One or more computer-readable storage media having computer executable instructions embodied thereon that, when executed, cause a computing device to perform the method of claim 1.

11. A system in a computing environment for configuring a network device having a plurality of physical interfaces, comprising:
   a first network;
   a second network; and
   a network device having a plurality of operational modes, wherein a first of the plurality of operational modes automatically bridges the first and second networks based on physical connections sensed by a media dependent interface component associated with the network device;
   wherein the media dependent interface component adjusts a polarity of the plurality of physical interfaces to improve efficiency in selecting the first operational mode.

12. The system according to claim 11, wherein a second of the plurality of operational modes causes the network device to operate as a point of access to the first or second network based on at least one physical connection associated with the network device and a response to at least one configuration message generated by the network device.

13. The system according to claim 11, wherein the first network is a wired network.

14. The system according to claim 13, wherein the second network is a wireless network.

15. The system according to claim 11, wherein the media dependent interface component determines whether the physical connections are homogenous.

16. A network device comprising:
   one or more logic drivers configured to provide instructions that automatically configure the network device for operating in a first, second, or third operational mode;
   memory configured for storing the instructions provided by the one or more logic drivers;
   a plurality of physical interfaces configured to perform at least one of receiving or transmitting communications;
   a media dependent interface component to provide internal crossover for improved efficiency in selecting one of the first, second, or third operational modes; and
   a processor configured to execute the instructions provided by the one or more logic drivers based on a message received on at least one of the plurality of physical interfaces.

17. The network device according to claim 16, wherein the network device includes a media dependent interface component configured for instructing the network device to operate in at least one of the first, second, or third operational modes.

18. The network device according to claim 16, wherein the processor is configured to utilize the one or more logic drivers to generate at least one configuration message for transmission on at least one of the plurality of physical interfaces.

19. The network device according to claim 18, wherein the processor is configured to select one of the first, second, or third operational modes based on whether an acknowledgment is received to the at least one configuration message.

20. The network device according to claim 19, wherein the acknowledgement is a Dynamic Host Configuration Protocol message.

* * * * *

UNITED STATES PATENT AND TRADEMARK OFFICE
CERTIFICATE OF CORRECTION

| | | |
|---|---|---|
| PATENT NO. | : 7,664,050 B2 | Page 1 of 1 |
| APPLICATION NO. | : 11/461759 | |
| DATED | : February 16, 2010 | |
| INVENTOR(S) | : Frost et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 527 days.

Signed and Sealed this

Thirtieth Day of November, 2010

David J. Kappos
*Director of the United States Patent and Trademark Office*